US010038690B2

(12) United States Patent
Andrews et al.

(10) Patent No.: US 10,038,690 B2
(45) Date of Patent: Jul. 31, 2018

(54) MULTIFACTOR AUTHENTICATION PROCESSING USING TWO OR MORE DEVICES

(71) Applicant: International Business Machines Corporation, Armonk, NY (US)

(72) Inventors: Scott M. Andrews, Carrar (AU); Christopher J. Hockings, Burleigh Waters (AU); Sumana Srinath Narasipur, Singapore (SG); Codur Sreedhar Pranam, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 15/168,778

(22) Filed: May 31, 2016

(65) Prior Publication Data
US 2017/0346815 A1   Nov. 30, 2017

(51) Int. Cl.
G06F 15/16 (2006.01)
H04L 29/06 (2006.01)
H04L 9/32 (2006.01)

(52) U.S. Cl.
CPC ........ H04L 63/0853 (2013.01); H04L 9/3271 (2013.01); H04L 63/0861 (2013.01); H04L 63/0869 (2013.01); H04L 63/0876 (2013.01)

(58) Field of Classification Search
CPC ... H04L 63/08; H04L 63/102; G06F 21/6218; H04W 12/06
USPC .......................................................... 726/4
See application file for complete search history.

(56) References Cited

U.S. PATENT DOCUMENTS

| 8,751,801 | B2* | 6/2014 | Harris ..................... G06F 21/31 713/168 |
| 8,806,205 | B2 | 8/2014 | Metke et al. |
| 2015/0046989 | A1* | 2/2015 | Oberheide .............. G06F 21/44 726/6 |
| 2015/0237039 | A1 | 8/2015 | Grajek et al. |

FOREIGN PATENT DOCUMENTS

| WO | 2005119608 A1 | 12/2005 |
| WO | 2014076539 A1 | 10/2014 |

OTHER PUBLICATIONS

Andres, "Smarter Security with Device Fingerprints," ForgeRock Community, Sep. 2015, 5 pages, printed Jan. 19, 2016, https://forgerock.org/2015/09/smarter-security-with-device-fingerprints/.

(Continued)

Primary Examiner — Evans Desrosiers
(74) Attorney, Agent, or Firm — Nicholas D. Bowman

(57) ABSTRACT

A first user request may be received to access a particular resource. A first authentication credential from a first client device may be received based on a first authentication challenge being issued to a user of the first client device. A second client device of the user may be notified to prompt the user to provide a second authentication credential to complete at least a second authentication challenge. The access to the particular resource may require at least successfully completing the first authentication challenge on the first client device and the second authentication challenge on the second client device.

12 Claims, 8 Drawing Sheets

(56) References Cited

OTHER PUBLICATIONS

Unknown, "Introducing Authy for Your Personal Computer," Authy, 3 pages, printed Feb. 4, 2016, Copyright 2015 Twilio Inc., https://www.authy.com/blog/introducing-authy-for-your-personal-computer.

Unknown, "PINgrid," Authlogics, 8 pages, printed on Feb. 12, 2016, United Kingdom http://authlogics.com/products/pingrid/.

Unknown, "SecureAuth IdP Device Fingerprinting: Low-Friction BYOD Authentication," SECUREAUTH, Technical Brief, Jun. 2015, 11 pages, © 2015 SecureAuth Corporation, Irvine, CA.

\* cited by examiner

| USER | DEVICE | APPLICATION | DEVICE FINGERPRINT | NOTIFICATION CAPABILITIES | OTHER DEVICE CAPABILITIES |
|---|---|---|---|---|---|
| User 1 | device 1 | Bank Application | Fingerprint 1 | SMS supported | human fingerprint reader |
| User 1 | device 1 | TOTP | Fingerprint 1 | SMS supported | human fingerprint reader |
| User 1 | device 2 | TOTP | Fingerprint 2 | SMS supported | accelerometer & gyro supported |

MULTIFACTOR AUTHENTICATION PROCESSING USING TWO OR MORE DEVICES

BACKGROUND

This disclosure relates generally to multifactor authentication processing, and more specifically, to utilizing authentication processing using two or more devices.

Multifactor authentication may consolidate two or more independent user credentials needed for access to a particular resource. These independent credentials can include: what the user knows (e.g., a password, account number, answers to security questions, etc.), what the user has (e.g., an ID card, credit card, driver's license, etc.), and what the user is (e.g., a retinal scan, voice-print, DNA analysis, etc.). Multifactor authentication thus generates a layered security approach to make it more difficult for an unauthorized user to access a particular resource (e.g., a physical location, computing device, network, database, etc.). Accordingly, if one factor is compromised, the unauthorized user may still have to pass at least one more factor before successfully accessing the particular resource.

SUMMARY

One or more embodiments are directed to a computer-implemented method, a system, and a computer program product. A first user request may be received to access a particular resource. A first authentication credential from a first client device may be received based on a first authentication challenge being issued to a user of the first client device. A second client device of the user may be notified to prompt the user to provide a second authentication credential to complete at least a second authentication challenge. The access to the particular resource may require at least successfully completing the first authentication challenge on the first client device and the second authentication challenge on the second client device.

Figure 1:
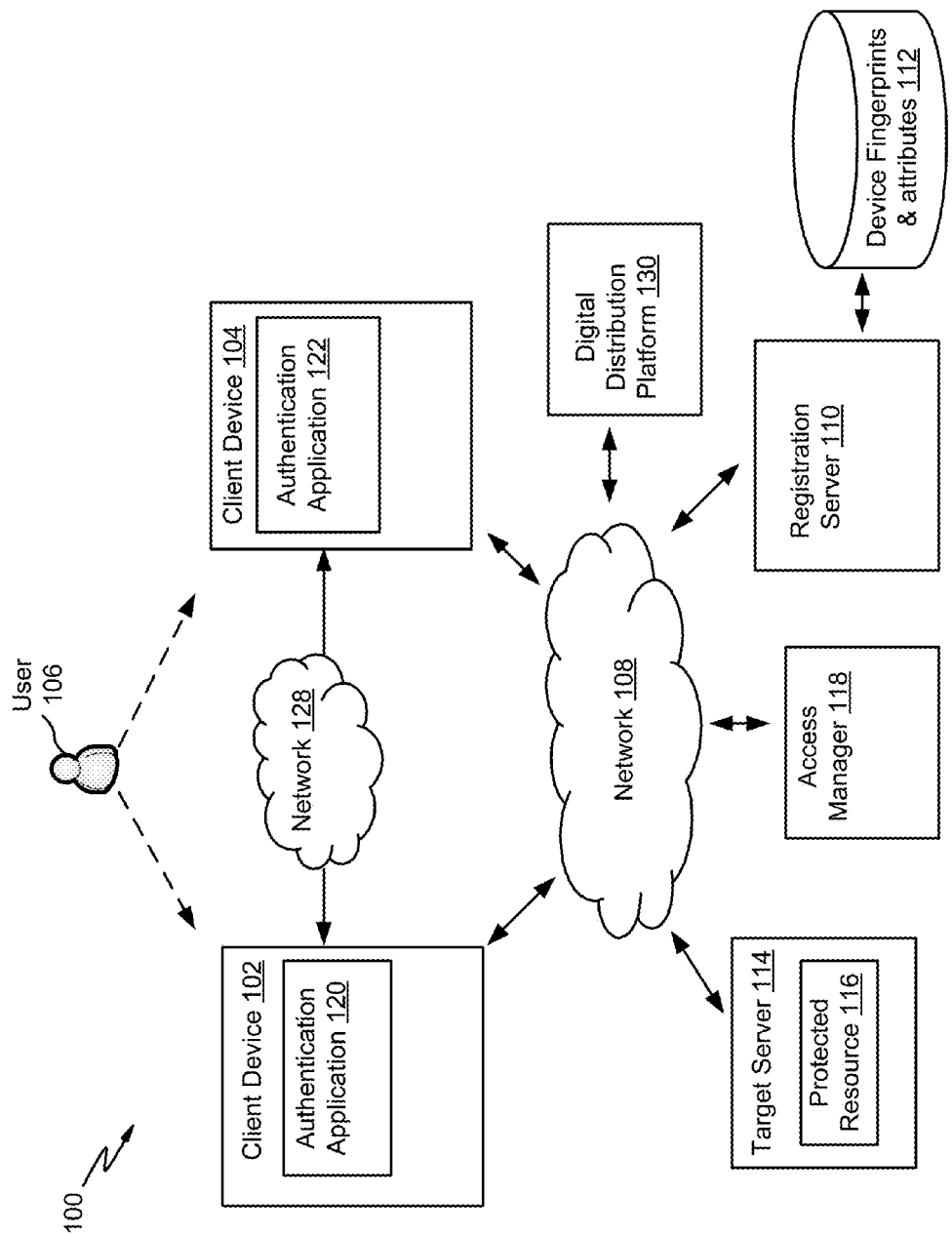
FIG. 1 is a block diagram of a computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to authentication processing, and more specifically, to utilizing authentication processing for two or more devices. While the present disclosure is not necessarily limited to such applications, various aspects of the disclosure may be appreciated through a discussion of various examples using this context.

A user may perform single factor/multifactor authentication from the same device, which may introduce various security threats. For example, a multifactor authentication system may require credentials based on what the user knows, such as a password and a secondary authentication software token (what the user has). Both of these factors may be provided using the same computing device. A software token (e.g., a soft token) may generate a single-use login PIN or other identifier (e.g., a one-time password (OTP)) for a particular session/quantity of time. For example, a Short Message Service (SMS) OTP code may be sent to a client device via a text message, which can be entered to authenticate a user for access to a particular set of (i.e., one or more of) data. However, because a software token is not something a user is physically in possession of and because software tokens are stored to user client devices (which are inherently insecure) software tokens may be subject to an attack surface.

Software token attack surfaces (or any security mechanism that requires only one device) may include physical access risks and malicious attack risk vulnerabilities. For example, physical access may occur when a user's laptop or mobile device is stolen and an unauthorized user copies/uses the software token for authentication into the authorized user's protected resource. Physical access may also occur in any office environment, for example, where co-workers or even members of cleaning staff can access/copy the software tokens. Alternatively, malicious software (e.g., viruses, worms, trojan horses, key loggers, etc.) may simply read the stored soft token and transmit the software token over a network to an unauthorized user. For example, a malicious phone app may be disguised as a gaming app, but in reality may be malware that slips through a backdoor to steal a software token PIN via key logging software.

Although software tokens and/or data may be encrypted or otherwise obfuscated on a particular client device, an attack surface risk may still remain. Software tokens/data may be encrypted as opposed to remain in plain text. Software tokens/data may also be hidden/scrambled in a particular way on a storage device (obfuscation). However, it is always possible to find/unscramble data/software tokens. Moreover, once an unauthorized user has a copy of the user's encrypted software token/data, the user can guess the password and attempt to decrypt the software token/data according to the password. The user can then check if the result is a valid software token. If the result is not valid, the user can keep trying passwords (i.e., offline dictionary attacks). Prevention of such attacks usually require the use of long and random passwords. However, it may be arduous for users to remember such long passwords. Therefore, offline dictionary attacks may be very successful. Accordingly, embodiments of the present disclosure are directed to authenticating a user based on the user utilizing two or more devices for a single session in order to access a particular resource.

Utilizing two or more devices may be useful for authentication to access a resource, particularly in a day where wearable devices and/or pocket devices (e.g., smart watches, smart phones, smart glasses, handheld devices, etc.) are prevalent and are continuously in possession by a user. Accordingly, having a user perform authentication for a particular resource using two or more devices that are in possession of the user may not be arduous and yet may provide more robust security than alternative measures.

FIG. 1 is a block diagram of a computing environment 100, according to embodiments. The computing environment 100 may include one or more client devices, such as client devices 102 and 104, each communicatively coupled with each other (via the networks 108 and 128) and to the digital distribution platform 130, the registration server 110, the access manager 118, and the target server 114. In some embodiments, the computing environment 100 may be implemented within a cloud computing environment, or use one or more cloud computing services. Consistent with various embodiments, a cloud computing environment may include a network-based, distributed/data processing system that provides one or more cloud computing services. Further, a cloud computing environment may include many computers, hundreds or thousands of them or more, disposed within one or more data centers and configured to share resources over the network 108.

Figure 8:
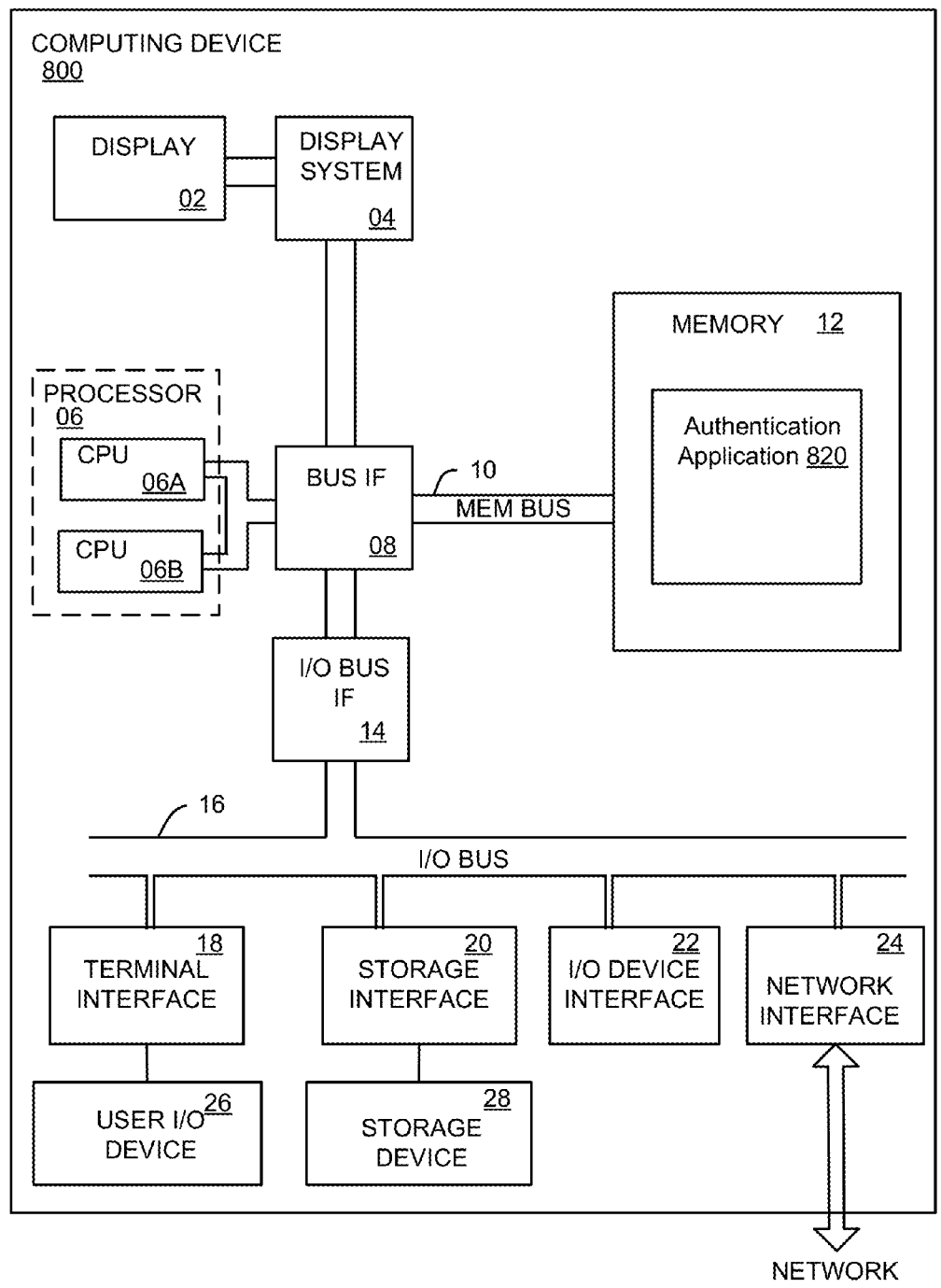
FIG. 8 is a block diagram of a computing device that includes an authentication application, according to embodiments.

Consistent with some embodiments, the client devices 102, 104, digital distribution platform 130, target server 114, access manager 118, and/or the registration server 110 may be configured the same as or analogous to the computing device 800 as illustrated in FIG. 8. In some computing environments, more or fewer components may be present than illustrated in FIG. 1. In various embodiments, some or each of the components—e.g., the digital distribution platform 130, the registration server 110, the access manager 118, and/or the target server 114—represent separate computing devices. In some embodiments, some or each of the components represent particular compute instances of a single computing device (e.g., program modules, computing components within a chassis, a blade server within a blade enclosure, an I/O drawer, a processor chip, etc.). For example, the access manager 118 may be combined with the registration server 110 on a single server computing device. As disclosed herein, some or each of the components of the digital distribution platform 130, the registration server 110, the access manager 118, and/or the target server 114 may refer generally to a "server system."

As illustrated in FIG. 1, each of the client devices 102 and 104 in some embodiments include the respective authentication applications 120 and 122. The functions of the authentication applications 122/120 may also represent functions of any other application as disclosed herein (e.g., the banking app 203 of FIG. 2). The authentication applications 122/120 may include Authentication Software Development Kits (SDKs), which may be a collection of software for developing authentication applications for a particular operating system. The authentication application 120/122 may include a thin wrapper around multi-factor authentication processes. The authentication applications 120/122 may include the fingerprint modules that take "device fingerprints" (or device identifiers), as described in more detail below. The authentication applications 120/122 may also include other attribute collection modules that collect various attributes of the respective client devices 102/122. For example, the authentication application 120 may scan the client devices 102 to determine delivery mechanisms available for the client device (e.g., SMS, email, etc.), which is described in more detail below.

The authentication applications 120/122 may also include various files such as source code files, example files, ReadMe files, etc. The authentication application 120/122 may further include a certificate, an encryption engine to provide an encryption algorithm, and a keying system (e.g., a private key for encrypting transactions), a software token, multi-factor requirements, etc. Application Program Interface (API) structures allow a function call to be made to the authentication application 122, which includes parameters such as PIN number to validate, notification mode (phone call, SMS, etc.), license key, etc. API calls may, for example, turn directly into web service calls to a cloud server, and those requests may be secured via a client certificate. As illustrated in FIG. 1, the user 106 may own or possess each of the client devices 102 and 104, which may both be needed for authentication to access the protected resource 116.

The client devices 102/104 may establish a connection or communicate with each other via the network 128, which may be any suitable network such as a Personal Area Network (PAN) (e.g., a Bluetooth® network), a local area network (LAN), a general wide area network (WAN), and/or a public network (e.g., the internet). In some embodiments, the client devices 102/104 may communicate with each other to determine whether there are any wirelessly paired devices for secondary authentication, as described in more detail below. The client devices 102/104 may also communicate with the other components via any suitable network 108. For example, the network 108 may be a LAN, a WAN, and/or a public network.

The digital distribution platform 130 (e.g., APP STORE, GOOGLE PLAY, etc.,) may be an online portal through which users can browse and download particular applications or other media content (e.g., audio, video, music, video games, etc.). The digital distribution platform 130 may correspond to one or more server computing devices such that the applications or other media content are stored on the one or more server computing devices.

The registration server 119 may store or persist historically invoked device attributes (e.g., fingerprints) and/or single web session device attributes (e.g., fingerprints) of a client device in the datastore 112. For example, at registration time, the authentication application 122 may scan the client device 104 to obtain a device fingerprint and transmit it to the device fingerprint and attribute datastore 112. At a later time, when a user wants to access a particular resource, the authentication application 122 may once again scan the client device 104 to obtain the device fingerprint and transmit it to the device fingerprint and attribute datastore 112. The registration server 119 may also store various other attributes (e.g., data values) of a client device, such as particular device capabilities of a client device, as described in more detail below. The registration server 119 may be utilized when the user first registers his/her client device and/or downloads particular content from the digital distribution platform 130.

The access manager 118 helps protect the protected resource 116 (e.g., a set of data) on the target server 114 that the user 106 is trying to access. In some embodiments, the protected resource 116 is located on the same computing device as the access manager 118. In some embodiments, access to the protected resource 116 is allowed only after successful primary and secondary authentication. Primary authentication occurs when a user first attempts to access the protected resource 116 (e.g., via a single sign-on password) with a first credential. Secondary authentication is one or more second-in-time (e.g., after successful primary authentication) authentication attempts with a second credential. However, the second credential may be a same type of credential as the first credential of primary authentication. For example, as long as two client devices are utilized for authentication, two passwords may be utilized to obtain the protected resource 116. Accordingly, multifactor authentication as disclosed herein may consolidate two or more user credentials needed for access to a particular resource, regardless of whether the credentials are independent or different from each other.

The access manager 118 may also capture device fingerprints and/or other attributes during any authentication attempt and forward such attributes to the registration server 110. For example, the authentication application 120 may provide a fingerprint of the client device 102 and transmit (e.g. via the network 108) the fingerprint to the access manager 118. The access manager 118 may then transmit the fingerprint to the registration server 110 in order to determine if there is a match to access the protected resource 116. These functions are described in more detail below.

Figures 2A, 2B:
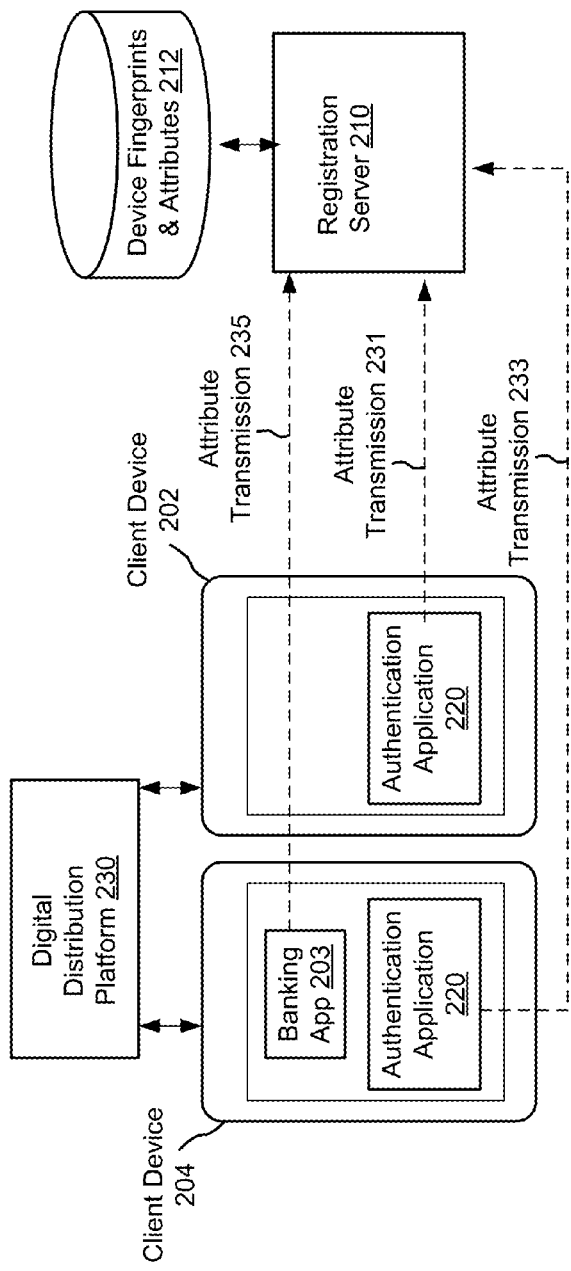
FIG. 2A is a block diagram illustrating application/device registration, according to embodiments.
FIG. 2B is a table that illustrates the attribute collection data of FIG. 2A, according to embodiments.

FIG. 2A is a block diagram illustrating application/device registration, according to embodiments. In some embodiments, FIG. 2A may be included within the environment 100 of FIG. 1. FIG. 2A illustrates that when a user requests to download a banking app 203 (or any other application) from the digital distribution platform 230, the user may have to undergo a registration process. As part of an application package, a banking institution, for example, may provide the authentication application 220 for use along with the banking app 203. In other embodiments, the banking institution may not necessarily provide the authentication application 220 but require a user to download any authentication application (as long as it supports the banking app 203) and register/transfer information about such application to a registration service before bank app 203 can be launched. It is recognized that the banking app 203 does not necessarily have to be a banking app. Rather, other applications may be downloaded such as: tax applications, proprietary business applications, private information applications, etc.

The user may first start by initiating installation of the primary banking app 203 from the digital distribution platform 230 on client device 204 (e.g., a tablet). The banking app 203 may include authentication capabilities in support of a primary authentication mechanism (e.g., username/password). Attributes (e.g., device fingerprints, notification capabilities, etc.) may then be collected from the banking app 203 and transmitted (attribute transmission 235) (e.g., via the network 108 of FIG. 1) to the registration server 210 during or after banking app 203 launch/configuration/installation. Because the banking app 203 may support username/password primary authentication, it may be registered with a registration service (corresponding with the registration server 210). The user may then initiate downloading of the authentication application 220 on the client device 204, which may be utilized for a secondary authentication factor. Attributes may then be collected from the authentication application 220 and transmitted (attribute transmission 233) to the registration server 210 during or after launch/configuration/installation of the authentication application 220 on client device 204. In some embodiments, the registration server 210 may then notify (e.g., via a SMS text) the client device 204 that the user should install the authentication application 220 (or a different supported authentication application) on a second client device for a secondary factor authentication mechanism. Accordingly, the user may then initiate installing of the authentication application 220 on client device 202 (e.g., a smart watch). Attributes may then be collected from the client device 202 and transmitted (attribute transmission 231) to the registration server 210 during or after launch/configuration/installation of the authentication application 220 on client device 202. The registration server 210 may take the data within the attribute transmissions 235, 231, and 233 to store within the device fingerprint and attribute 212.

In some embodiments, attributes from a particular client device are collected actively (e.g., provided by the client device/application), which is described in more detail below. In some embodiments, the attributes may be collected passively (e.g., derived by a server from a client-side script (e.g., JavaScript)). For example, browser details that uniquely identify plugins and other device fingerprint information may be collected from JavaScript and queried by the registration server 210, as opposed to the banking app 203 or the authentication application 220. In various embodiments, the attributes are transmitted to the registration server 210 in an automated fashion (e.g., as a background task via the operating system/API during installation, configuration, and/or launch) or in response to a request, wherein a user provides the attributes.

FIG. 2B is a table 200 that illustrates the attribute collection data of FIG. 2A, according to embodiments. In some embodiments, the table 200 may represent a database table object as would be found in the device fingerprint and attribute 212 of FIG. 2A. The data in the table 200 may be generated in response to the attribute collections 235, 231, and 233. The table 200 includes various fields (e.g., columns) such as: a user ID field, a device ID field, an application field, a device fingerprint field, a notification capabilities field, and one or more other device capabilities fields.

The User field uniquely identifies each user. Each user may be assigned based on the device(s) they register (e.g., via the device ID fields). The device ID field uniquely identifies each client device (e.g., the client device 204/202). The device ID may correspond to an IP address of a client device and/or other device identifier (e.g., an International Mobile Equipment Identify (IMEI) identifier, or Mobile Equipment Identifier (MEID) identifier). As illustrated in the device ID field, there are two devices—device 1 and device 2 (client device 204 and 202)—that belong to the same user. In some embodiments, the device fingerprint field may exist without the device ID field, as the device fingerprint field may include the device ID.

The application field specifies what application/application type a particular record corresponds with. For example, for the first record, the banking app 203 may transmit to the registration server 210 an identifier indicating that it is a banking application. The application field indicates that user 1 has or is downloading a banking application and two Time-based One-time Password (TOTP) authentication applications.

The device fingerprint field specifies one or more unique characteristics about a tangible client device. These unique characteristics include but are not limited to: public IP port, operating system name, public Domain Name Server (DNS) host, screen resolution, server timestamp, header, fonts, plug-ins, IP address, storage facilities, cookie storage, device brand, device model, version of the firmware, Geo location, etc. Device fingerprints may be obtained in any suitable manner. For example, the registration server 210 may query the client device 204 to obtain various characteristics about the client device 204 via a session web browser and scripting language (e.g., JavaScript) of the client device 204. In some embodiments, the registration server 210 may send the client device 204 a secure cookie such that session details and a client device fingerprint are obtained. In alternative embodiments, the client device may be redirected to a link tracking Uniform Resource Locator (URL) where public characteristics are obtained.

In some embodiments, a client device or application may actively transmit a device fingerprint to the registration server. In an example illustration of how this may work, the client device 204 may include various hardware components, such as a motherboard, a Bluetooth® device, a camera device, one or more Central Processing Units (CPUs), one or more Random Access Memory (RAM) devices, a network card, flash memory, and one or more memory cards (e.g., a Secure Digital (SD) card, a Subscriber Identity Module (SIM) card, etc.). Each hardware component may include its own hardware component identifier (e.g., a serial number). A processor may read/extract each of the hardware component identifiers of each hardware component in order to identify the set of hardware components that are within the client device 204. For example, the reading/extracting may include a Windows Management Instrumentation (WMI) engine in order to extract each hardware component's hardware identifier. In these embodiments, a developer may write WMI scripts or commands in order for the scripts or commands to perform particular administrative tasks. For example, these scripts may cause the processor to perform identifier extraction in an automated fashion. In an example illustration, a WMI script instruction to obtain a component identifier of the RAM may be: "wmic memorychip get serialnumber." The client device 204 may then utilize a mathematical algorithm to combine some or all of the characters of each hardware component identifier of each hardware component to generate a device fingerprint. This device fingerprint may then be transmitted to the registration server 210 and stored as a value under the device fingerprint field in the table 200. In some embodiments, a client device may transmit each of the hardware component identifiers to the registration server to determine what hardware components a client device has and other device capabilities, as described in more detail below.

The notification capabilities field may specify the particular notification mechanisms that a particular client device supports. For example, the authentication application 220 may scan the client device 204 to determine that the client device 204 supports SMS, notification and email services, cellular phone transmission, etc. Other supporting data may be coupled with this information such as mobile numbers, email addresses, etc. so that the registration server knows how and at what address to notify a particular client device for authentication during runtime.

The other device capabilities field of the table 200 may correspond to one or more fields that the registration server may utilize to obtain various other units of information about a client device's capabilities. For example, the authentication application 220 may scan the client device 204 and determine that the client device 204 has a human fingerprint reader/application and transmit this information to the registration server 210. A human fingerprint reader, for example, may capture human finger images (e.g., via a camera and light of a client device) and convert them to fingerprint templates. Such fingerprint templates may be utilized for what-a-user-is type of authentication. Accordingly, if a registration server knows that a client device has a human fingerprint reader/app (or any other type of authentication mechanism), the registration server may notify a particular client device that the user must perform authentication using his/her fingerprint (or other authentication mechanism). In some embodiments, the table 200 may include human fingerprint templates within the table 200 (derived from a first device) such that when the user authenticates using a second device, he or she must provide an identical or analogous template for authentication (i.e., register his/her fingerprint again).

In another example, other device capabilities obtained by the registration server may include whether the client device has a gyroscope and/or accelerometer. An accelerometer and/or gyroscope may measure acceleration and/or the angular velocity of a client device. The accelerometer and/or gyroscope may be utilized at runtime and/or authentication challenging time to infer whether a user is in possession of a client device for authentication challenge purposes, as described in more detail below. An "authentication challenge" as described herein may be a request for a user/client device to provide information in order to validate that the user is who he/she says she is. Authentication challenges may require the user to therefore input one or more "authentication credentials" based on what the user knows, has, is, etc. In some embodiments, an authentication credential in addition or instead may be automated such that the user does not manually enter in the credential. For example, an authentication credential may be a device fingerprint or any other attribute.

In some embodiments, other attribute information may be obtained within the other device capabilities field such as whether a client device has a camera in order to do presence awareness and authentication at run time. A camera may help identify a person, thereby helping to perform a what-a-user-is type of authentication. For example, if a second device includes a camera, the system (e.g., the registration server 210) could specifically trigger or force a strong authentication using a camera. In an illustration, on a user's secondary device (e.g., a smart watch), and at registration time, an application may transmit attributes specifying that the secondary device includes a camera and a SMS receiving application. In response to the receiving of these attributes, the system may request that the user take a first picture of his/her face and transmit the picture to the system such that the system (e.g., the device fingerprints and attributes datastore 212) stores the picture to match against another picture taken at runtime. At runtime the user may have a primary device (e.g., a mobile phone) to complete primary authentication. The user may then be asked to perform secondary authentication on the user's secondary device by taking a second picture of his/her self. The second picture may then be compared to the first picture to determine whether the second picture matches (e.g., via digital pattern recognition or matching that corresponds with facial patterns) the first picture. And if the second picture matches the first, successful authentication may occur.

In an example illustration of how a record of the table 200 in FIG. 2B may be populated in near real-time may be as follows. As soon as the user initiates downloading of the authentication application 220 on client device 202, the last record down from the top of the table 200 may begin to be populated. For example, during downloading, as part of the attribute transmission 231, the authentication application 220 within the client device 202 may transmit: user ID (user 1), client device ID (device 2), application (TOTP), device fingerprint (fingerprint 2), notification capabilities (SMS supported), and other device capabilities (accelerometer and gyro supported). Identical or analogous procedures may be performed for both the bank app 203 (1st record of the table 200) and the authentication application 220 within the client device 204 (2nd record of the table 200).

Figure 3:
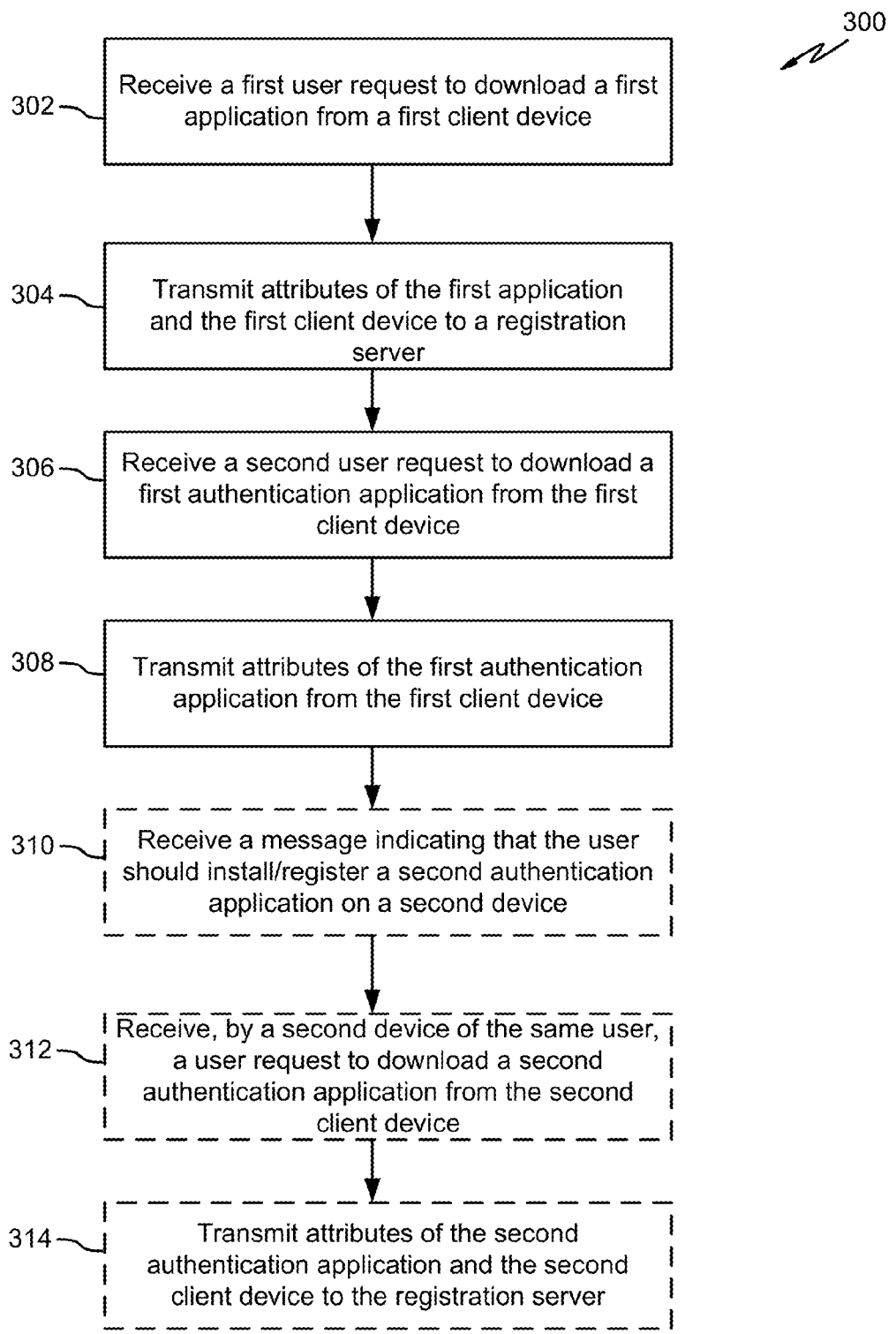
FIG. 3 is a flow diagram of an example process illustrating application registration, according to embodiments.

FIG. 3 is a flow diagram of an example process 300 illustrating application registration, according to embodiments. In some embodiments, the process 300 represents some or all of the operations performed in FIGS. 2A and 2B. The process 300 may begin at block 302 when a first user request is received (e.g., by the banking app 203 of FIG. 2A) to download a first application from a first client device. Per block 304, attributes of the first application and the first client device may then be transmitted (e.g., attribute transmission 235) to a registration server. Per block 306, a second user request to download a first authentication application from the first client device may be received (e.g., the authentication application 220 on client device 204). Per block 308, attributes of the first authentication application from the first client device may be transmitted (e.g., attribute transmission 231).

In some embodiments, per block 310, a message may be received (e.g., by the first client device) that the user should register/install a second authentication application on a second device. The second device may be utilized at runtime or challenge time to provide a secondary factor for authentication. In some embodiments, the second authentication application is the same as the first authentication application. In some embodiments, blocks 310 through 312 do not occur, as a user may not be notified about the second device until run time/challenge time. Per block 312, the second device of the same user may receive a request to download a second authentication application from the second client device (e.g., the authentication application 220 of client device 202). Per block 314, attributes of the second authentication application and the second client device may be transmitted (e.g., attribute transmission 231) to the registration server.

Figure 4:
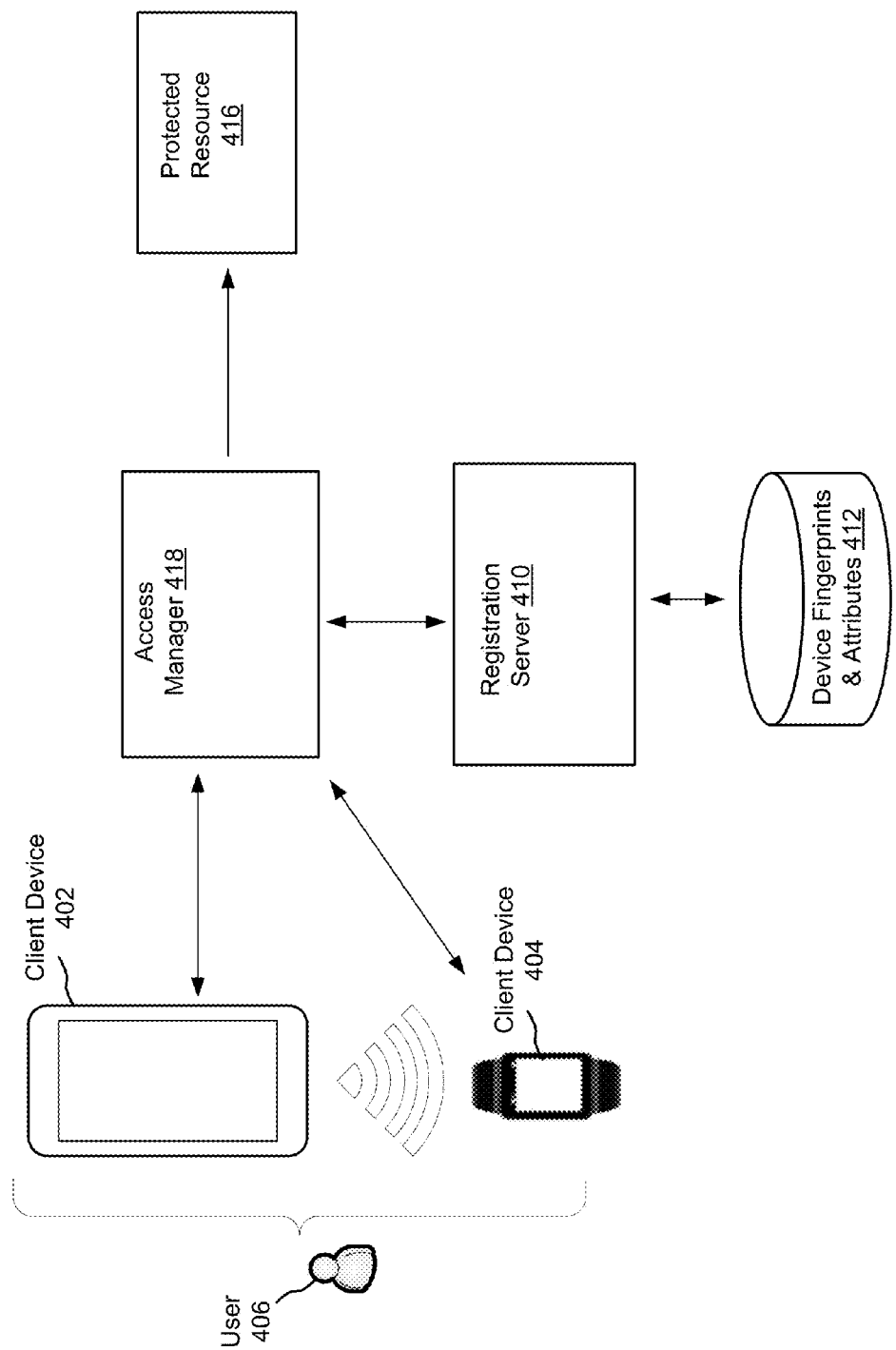
FIG. 4 is a block diagram illustrating how a protected resource is securely retrieved at run time, according to embodiments.

FIG. 4 is a block diagram illustrating how a protected resource is securely retrieved at run time, according to embodiments. In some embodiments, FIG. 4 may be included in the computing environment 100 of FIG. 1 and/or include the components in FIG. 2. FIG. 4 includes two client devices—402 (a smartphone) and 404 (a smart watch)—that are owned or in possession by the same user 404. FIG. 4 also includes an access manager 418 (e.g., the access manager 118 of FIG. 1), a registration server 410 (e.g., the registration server 110 of FIG. 1), the device fingerprint and attribute 412 (e.g., the device fingerprint and attribute 112), and the protected resource 416 (e.g., the protected resource 116 of FIG. 1). Although the client devices 402 and 404 are illustrated as a smart phone and smart watch respectively, they may be any suitable computing device. For example 2 mobile phones, a mobile phone and a Personal Computer (PC), a tablet and a PC, a mobile phone and a tablet, a smart vehicle and a tablet, etc.

The user 406 may first request access (e.g., from the banking app 203 of FIG. 2) to the protected resource 416 (e.g., a set of data, a physical location, computing device, network, database, etc.) using the client device 402. The user may then be prompted to complete primary authentication from the client device 402. For example, the user may be prompted to provide a username and a password to the access manager 418. In some embodiments, the access manager 418 may then consult the registration server 410 to determine whether the username and password match the username and password as initially provided at registration. In other embodiments, the consultation of the registration server 410 may not occur until other attributes are collected, as described below. During the first access request, during or as a part of the primary authentication, and/or after the completion of the primary authentication, application(s) (e.g., the banking app 203/authentication application SDK) may collect and transmit various attributes to the access manager 418. For example, the application(s) may transmit some or each of the type of data within the table 200 in the same or analogous manner as transmitted at registration. Accordingly, the client device 402 may transmit a user identification, a device ID, application, device fingerprint, notification capabilities, and/or other device capabilities.

In some embodiments, as a policy for choosing which second device to perform secondary authentication with, the client device 402 may also transmit any wirelessly paired device IDs. For example, during registration (e.g., FIGS. 2A and 2B), a user may have registered multiple secondary devices or installed an application on multiple devices. However, some of the devices may not currently be near or in possession of the user 406. In order to rank or prioritize which client device to utilize for secondary authentication, the client device 402 may try to determine which devices are within a particular range of the user 406's client device 402 so that the user 406 does not have to arduously search for the second device to perform secondary authentication.

In an example illustration, client device 402 may transmit radio waves/send broadcasts (e.g., by a Bluetooth® transmitter via the network 128 of FIG. 1) in its immediate environment to determine whether there are any wirelessly paired devices inside of a signal strength/distance threshold (e.g., addresses within a particular address range). The client device 404 may be inside of the threshold and transmit back to the client device 402 its device ID or other identifier such that the client device 402 (or client device 404) may obtain and transmit the device ID of client device 404 to the access manager 418 (or registration server 410). Accordingly, when the access manager 418 receives the device ID attribute of client device 404 and forwards it to the registration server 410 to search within the device fingerprint and attribute 112, the device ID may be matched to the device ID (or other attribute) registered at registration time. Therefore, the access manager 418 may know which client device (client device 404) to send a notification to for secondary authentication. Alternatively, in some embodiments, the client device 402 may provide/display a notification indicating that the user should manually enter in a second client device ID or IP address using client device 402, which would be transmitted to the access manager 418/registration serve 410 and matched, as discussed above. The signal strength threshold may be any suitable signal strength value. For example, the signal strength threshold may be any value below −70, −80, or −90 decibels (db) in a received signal strength indicator (RSSI) range. The signal strength may alternatively be measured in decibel-milliwatts (dbm), or any other appropriate unit measurement In some embodiments, an accelerometer/gyroscope within the client device 404 the may be utilized to infer whether a user is in possession of the client device 404 for authentication challenge purposes. Acceleration/angular velocity information can be received by a client device such that it knows that it must transmit a message upon movement outside of a threshold at runtime so the registration server 410 and/or access manager 418 may anticipate what client device to send a notification to for engaging in an authentication challenge. For example, after a user performs primary authentication issuing a first credential on client device 402 (or when a user receives a notification to perform primary authentication), the client device 402 in some embodiments may send a broadcast to secondary devices to determine which secondary devices are within a wireless range. However, the broadcast may include a specific query for the secondary devices to notify the client device 402 (or registration server 410 and/or access manager 418) if movement of the secondary devices occurs outside of a threshold. If movement occurs outside of the threshold within a particular time frame, the client device 404 may then notify the client device 402 and/or the access manager 418/registration server 410.

For example, the movement threshold may be crossed when the user 406 moves his/her hand with a smart watch (client device 404) attached to his/her hand or crossed when the user 406 takes his/her phone out of his/her pocket. Therefore, an inference may be made that the user 406 is in close possession of the client device 404 and that a secondary authentication challenge should be performed using the client device 404. The gyroscope/accelerometer embodiments may be utilized as an even more precise measurement to infer which client devices are closest to the user 406. For example, multiple client devices may be in wireless range of the client device 402. However, the user 406 may only be wearing/in possession of only one of those devices. Accordingly, in order to make access to the protected resource 416 less arduous for the user 406, the client device that is most near to the client device 402 (using the gyroscope and/or accelerometer) may be utilized to perform secondary authentication.

In some embodiments, signal strength values may be transmitted to the client device 402/server system to infer which client device is nearest to the user 406. For example, using the illustration above, when the client device 402 transmits radio waves/sends broadcasts (e.g., via a Bluetooth® transmitter) in its immediate environment to determine whether there are any wirelessly paired devices inside of a signal strength/distance threshold, the client device 402 may also receive multiple signal strength readings between the client device 402 and the other devices (e.g., one device at −70 db, a second device at −20 db). The client device 402 may then collect these readings and determine which reading corresponds to the highest signal strength and transmit the associated client device ID or other identifier of the highest signal strength to the access manager 418/registration server 410. The client device with the highest signal strength is presumably the client device that is closest to the client device 402.

After the client device 402 collects one or more of these attributes (e.g., device fingerprints, secondary devices within a range, notification capabilities, etc.), in some embodiments, these attributes are transmitted to the access manager 418. These attributes may then be forwarded/transmitted to the registration server 410 to determine whether there is a match within the device fingerprint and attributes datastore 412 between one or more of the attributes transmitted and one or more attributes derived at registration time (e.g., the attributes as specified in the table 200). If there is a match of one or more of these attributes, the registration server 410 may then notify the access manager 418 that there is a second factor application installed on client device 404 registered for the same user 406 and that the client device 404 needs to be the device used for authentication (e.g., because it is in wireless range of the client device 402).

In some embodiments, the access manager 418 may then transmit a notification to the client device 402 indicating that the user must complete secondary authentication using options other than the second factor application on the same device. In other embodiments, the access manager 418 may transmit a notification to the client device 402 indicating that the user needs to complete secondary authentication, without specifying the means or manner in which to do so. The access manager 418, in some embodiments, may then notify the client device 404 indicating that the user 406 must authenticate using the client device 404/and or that the second factor authentication application (e.g., application 220 on client device 202 of FIG. 2A) must be launched to complete authentication for access.

In some embodiments, after the user completes secondary authentication on client device 404, the secondary authentication information is transmitted to the access manager 418 and forwarded to the registration server 410. The registration server 410 may then scan the device fingerprints and attributes datastore 412 to match the attribute information with attribute information provided at registration time. If there is a match, the registration server 410 may notify the access manager 418 of such match such that the access manager 418 grants access to the protected resource 416. In some embodiments, information other than the secondary authentication credential may be transmitted to the access manager 418/registration server 410 and tested. For example, one or more attributes, such as device ID, device fingerprint, other device capabilities, etc. may be collected/transmitted from the client device 404 (e.g., in a similar manner as specified in FIG. 2A) to the access manager 418 and/or registration server 410. The registration server 410 may then take these transmitted one or more attributes and match them with one or more attributes as found within the device fingerprint and attribute 412. If there is a match, the access manager 418 may then allow access to the protected resource 416.

Figure 5:
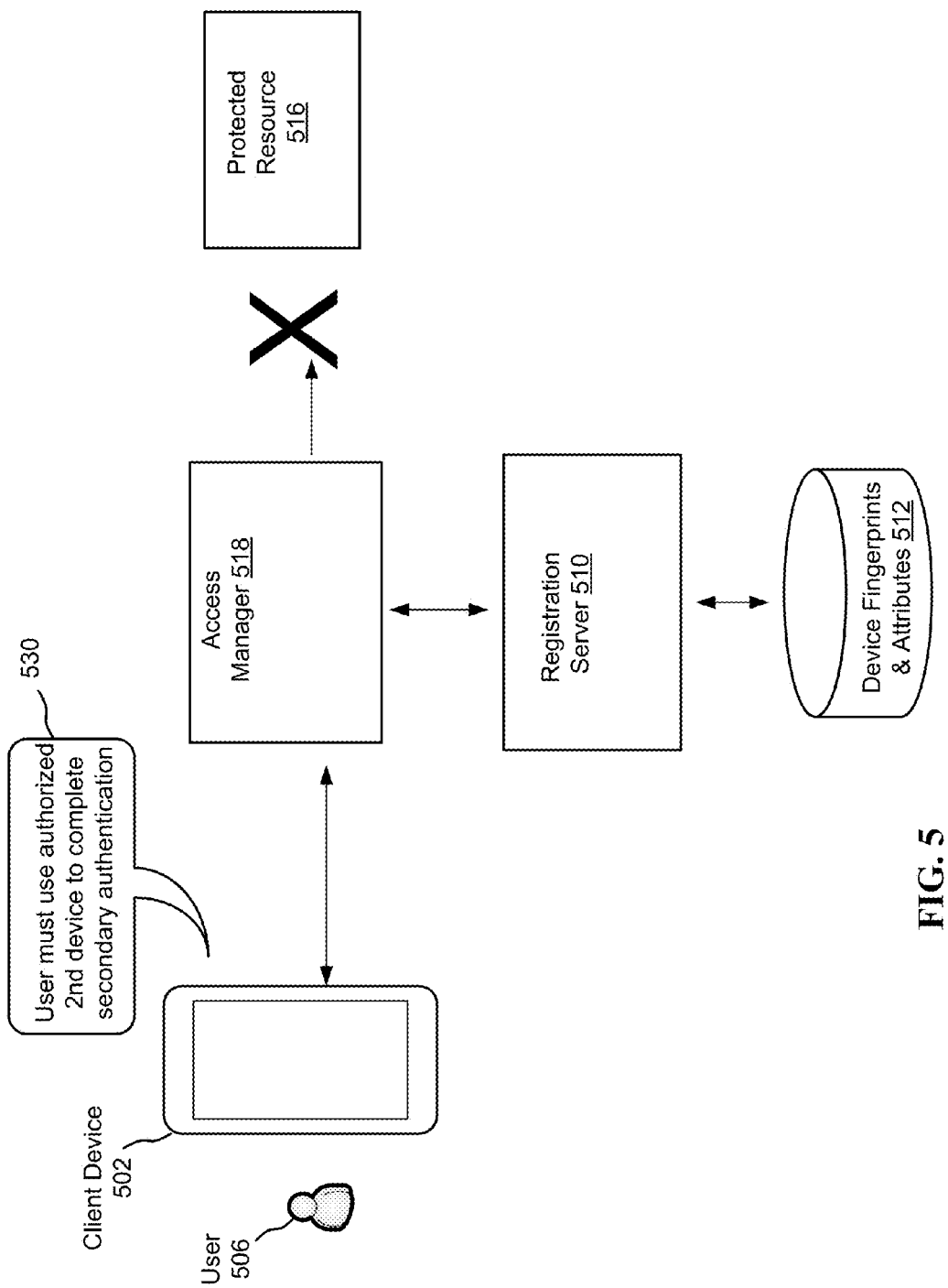
FIG. 5 is a block diagram illustrating how access to a protected resource may be denied at run time, according to embodiments.

FIG. 5 is a block diagram illustrating how access to a protected resource may be denied at run time, according to embodiments. FIG. 5 may incorporate the same/analogous processes as FIG. 4 except that the user is trying to access the protected resource using only one client device instead of two client devices. FIG. 5 includes the user 506 and his/her client device 506, a notification 530, an access manager 518, a registration server 510, a device fingerprint and attribute datastore 512, and a protected resource 516.

The user 506 may first request access (e.g., from the banking app 203 of FIG. 2) to the protected resource 516 using the client device 502. The user may then be prompted to complete primary authentication from the client device 502. For example, the user 506 may be prompted to provide a username and a password to the access manager 518. In some embodiments, the access manager 518 may then consult the registration server 510 to determine whether the username and password match the username and password as initially provided at registration. In other embodiments, the username and password are checked along with other attributes as described below. During the first access request, during or as a part of the primary authentication, and/or after the completion of the primary authentication, application(s) (e.g., the banking app 203/authentication application SDK) may collect and transmit various attributes to the access manager 518. For example, the application(s) may transmit some or each of the type of data within the table 200 in the same or analogous manner as transmitted at registration. Accordingly, the client device 502 may transmit a user identification, a device ID, application, device fingerprint, notification capabilities, and/or other device capabilities.

After the client device 502 collects one or more of these attributes (e.g., password/username, fingerprints, device pairings, notification capabilities, etc.), in some embodiments, these attributes are transmitted to the access manager 518. These attributes may then be forwarded/transmitted to the registration server 510 to determine whether there is a match within the device fingerprints and application datastore 512 between one or more of the attributes transmitted and one or more attributes derived at registration time (e.g., the attributes as specified in the table 200). If there is a match of one or more of these attributes, the registration server 510 may then notify the access manager 518 that there is a second factor application installed on another client device that is registered for the same user 506 and that the client device needs to be the device used for secondary authentication.

In some embodiments, the access manager 518 may then transmit a notification to the client device 502 indicating that the user must complete secondary authentication. The user 506 (which may be an unauthorized user) may then try to input another authentication credential from the same client device 502. When the user inputs the credential, the access manager 518/registration server 510 may determine that the same client device 502 and/or the same authentication application is being used to input the same or different credential. For example, when the user 502 enters and transmits the second credential, one or more attributes may responsively be collected and transmitted again (e.g., the attributes within the table 200 of FIG. 2) to the registration server 510/access manager 528 in an identical or analogous manner as described above. The registration server 510 may then determine that the user's secondary authentication requirement has not been met because, for example, the same device was used to authenticate. Accordingly, the access manager 518 may deny access to the protected resource 516 and in some embodiments, may display the notification 530 indicating that the user must use an authorized second device to complete secondary authentication. In some embodiments, however, the notification 530 may only indicate that the authentication attempt failed without specifying any other information. This may be useful so as to not provide any "hints" to an unauthorized user of what needs to be required for secondary authentication.

Requiring layered authentication on a different device may have several advantages. For example, as discussed above, the user 506 may be an unauthorized user and may have gained access to one or more applications on the client device 502 via malware installed on the client device 502 or other physical theft means. Accordingly, the user 506 may be able to provide primary authentication associated with the client device 502. However, the user 502 must provide secondary authentication using another physical device, which the user 502 may not have access to either remotely or physically.

Figure 6:
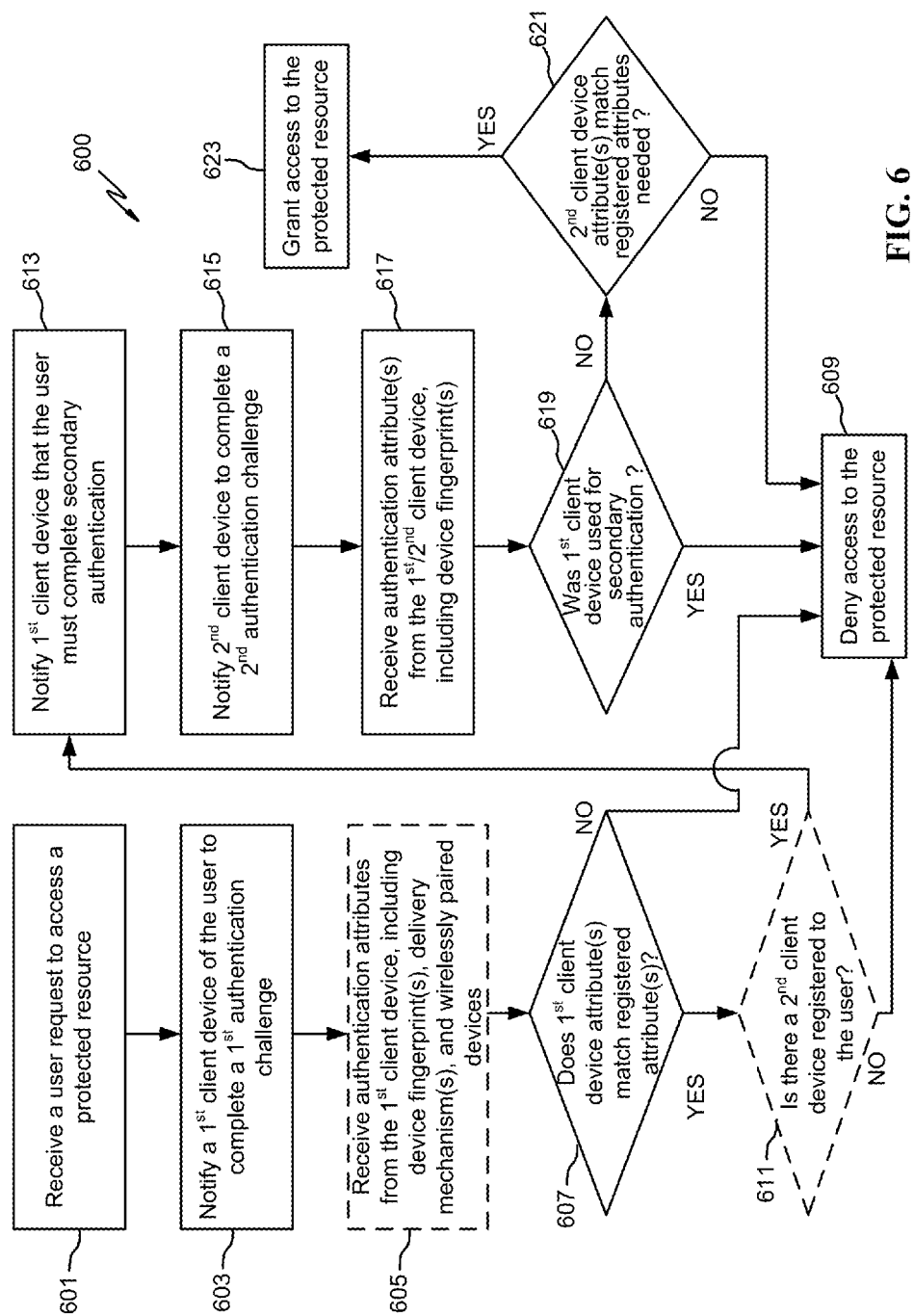
FIG. 6 is a flow diagram of an example process for determining whether a particular user may have access to a protected resource, according to embodiments.

FIG. 6 is a flow diagram of an example process 600 for determining whether a particular user may have access to a protected resource, according to embodiments. The process 600 in some embodiments may include the operations as specified in FIG. 4 and/or FIG. 5. The process 600 may begin at block 601 when a user request is received (e.g., by the bank app 203 or the access manager 418 of FIGS. 2/4) in order to access a particular resource. Per block 603, a first client device of the user may be notified to complete a first authentication challenge, such as a username/password. Per block 605, authentication attributes may be received (e.g., by a registration server) from application(s) of the first client device. In some embodiments, these authentication attributes may include various attributes from one or more applications such as device fingerprints, delivery mechanisms (e.g., information specifying that the first client device is SMS notification supported), and whether there are any wirelessly paired devices associated with the first client device. Block 605, may also correspond to receiving the primary authentication challenge factor provided by the user. In some embodiments, any attributes as discussed herein whether at register time or runtime may be transmitted/obtained to or from the first client device as part of background task via the operating system/API during/after register time (e.g., downloading of an application) and/or during or after run-time (e.g., in response to an authentication challenge).

Per block 607, it may be determined (e.g., by the registration server 110 and/or access manager 118) whether one or more of the $1^{st}$ client device attributes specified in block 605 match corresponding registered attributes. For example, the registration server 110 may receive the first authentication challenge credential and the device fingerprint at runtime subsequent to the user request (block 601), which may be checked against the table 200 of FIG. 2 to determine whether the same first authentication challenge credential and the device fingerprint has been registered. If one or more of the $1^{st}$ client device attributes do not match, such as the username/password credential and/or device ID, then per block 609, access to the protected resource may be denied.

Per block 611, if one or more of the client attributes match, then it may be determined (e.g., by the registration server 110) whether there is a second client device registered to the user. This may be determined, for example, by scanning the table 200 and determining that the same user (user 1) has registered a second client device (device 2). In some embodiments, instead or in addition to block 611, it may be determined as part of the attribute receiving in block 605 whether a second client device is wirelessly paired (e.g., via Bluetooth® as discussed above) with the first client device. In some embodiments, if there is no device that is wirelessly paired, then block 611 may be performed. In some embodiments, if there is a device that is wirelessly paired and this information is communicated to a server system (e.g., a registration server), then block 611 may not be performed. Rather block 613 may follow block 607 in these embodiments. In some embodiments, if the user did not register a second client device/application, the user may be prompted/notified to do so before access can complete. In other embodiments, the prompting/notifying may occur during registration time (e.g., FIGS. 2A and 2B) such that the user will not be able to register an application/client device until he/she registers a second client device with a second authentication application downloaded.

Per block 613, and in some embodiments, the first client device may be notified (e.g., by the access manager 118) that the user must complete secondary authentication. The secondary authentication may require the user to present a particular credential located on the second client device. Per block 615, the second client device may then be notified (e.g., by the access manager 118 of FIG. 1) to complete a second authentication challenge credential. The user may or may not be in possession of or near the second client device, but as described above the selection for notification may be based on: whether the second device was wirelessly paired with the first device, whether the second device experienced a movement threshold (e.g., via an accelerometer), and/or whether the second device was registered by the user.

The user may then enter a second authentication credential as part of the second authentication challenge. For example, the second authentication challenge may require a human fingerprint scan, another username/password, a soft token code entry, a retinal scan, etc. Per block 617, one or more authentication attributes either from the first client device or second client device may be received (e.g., by the access manager 118). For example, an unauthorized user may not have access to the second client device and may try to give another authentication credential to the server system. Alternatively, an authorized user may have located the second client device and entered the secondary factor on the second client device.

Per block 619, it may be determined (e.g., by the registration server 110) whether the first client device was used for secondary authentication. This may be determined by obtaining the device ID or fingerprint according to methods as described above. If the first client device is used for secondary authentication, then the user may be denied access to the protected resource, per block 609. Per block 623, if the first client device was not used for secondary authentication and the second client device was used, it may be determined (e.g., by the registration server 110) whether the one or more second client device attributes match the one or more registered attributes that may be required to complete the secondary authentication.

If one or more of the second client device attributes do not match one that is needed for secondary authentication, then access to the protected resource may be denied per block 609. For example, even if the user utilized the second client device but the user did not successfully provide the needed secondary credential as required by an authentication application, such as a human thumbprint template, and instead input a password, then access may be denied. Per block 621, if one or more of the second client device attributes match the one or more registered attributes needed, the access may be granted (e.g., by the access manager 118) to the protected resource.

Figure 7:
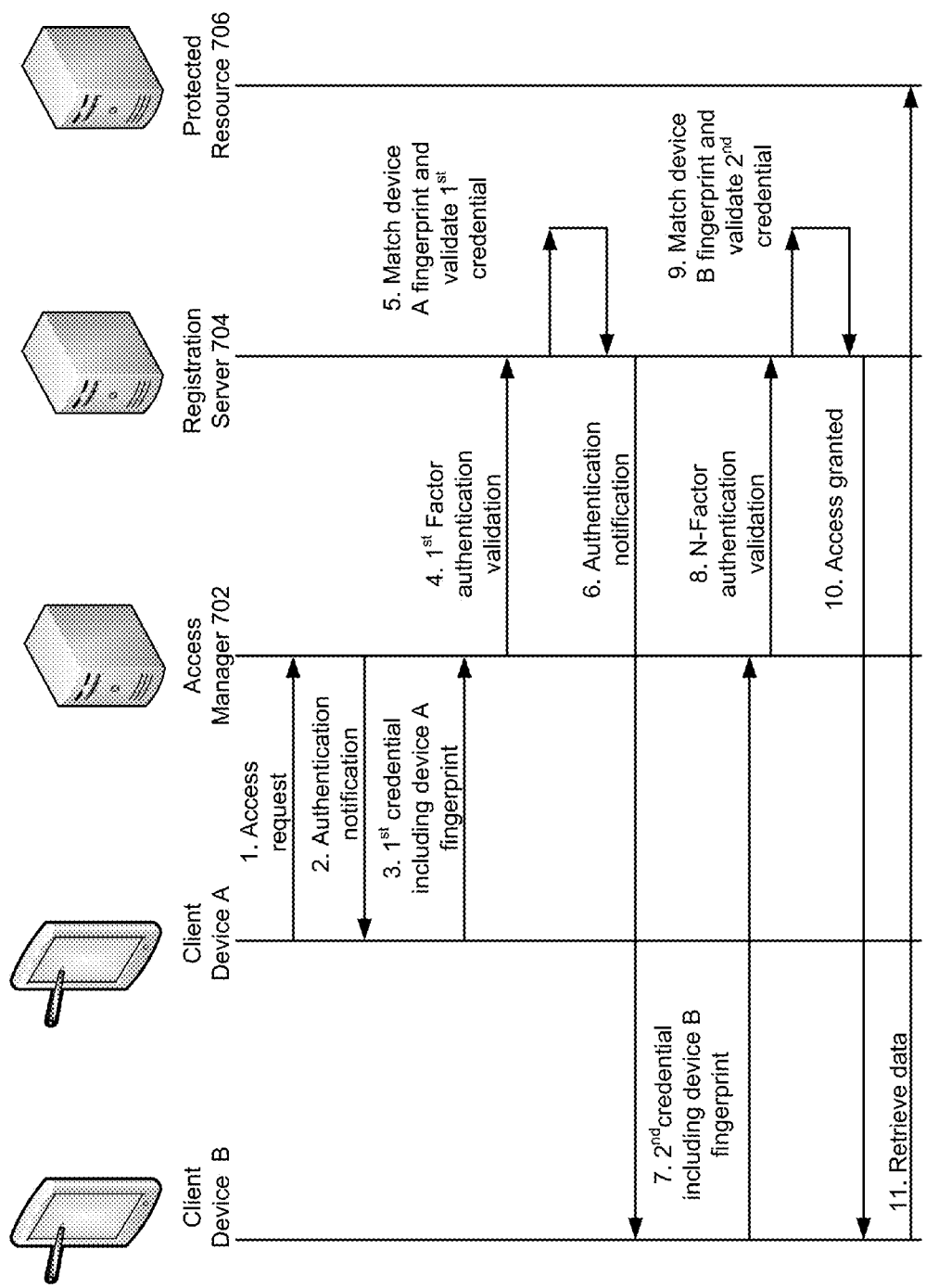
FIG. 7 is a sequence diagram of an example process for retrieving a protected resource based on fingerprint and/or attribute matching, according to embodiments.

FIG. 7 is a sequence diagram of an example process for retrieving a protected resource based on fingerprint and/or attribute matching, according to embodiments. The sequence diagram may be included in the computing environment 100 and/or may perform some or all of the operations as specified in FIGS. 1, 2, 3, 4, 5, and/or 6 herein. The sequence diagram may include client device B, client device A, access manager 702, registration server 704, and the protected resource 706, which may be data that the user is trying to access. A user on client device A may first request to access data located on the protected resource 706 and which is intercepted by the access manager 702. The access manager 702 may then provide an authentication challenge to the client device A indicating that a user must complete a primary factor authentication credential and/or provide the primary authentication challenge. Per the third step, the user may generate the primary authentication credential (e.g., a username and password), while client device A transmits (or the access manager 702 retrieves) the Device A fingerprint (and potentially other attributes as specified in the table 200) to the access manager 702. In some embodiments, the user need only provide the first credential (e.g., because the user is using an unregistered computing device in a public library). Per step 4, the access manager 702 may then forward the first credential and/or device A fingerprint to the registration server 704 for first factor authentication validation.

Per step 5, the registration server 704 may match the client device A fingerprint to the corresponding device fingerprint within a database (e.g., the device fingerprint and attribute 112). The corresponding device fingerprint may have been pre-registered, such as at registration time in FIGS. 2A and 2B. The registration server 704 may instead of or additionally validate the first credential (e.g., verify that the password provided by the user is correct). Per step 6, the registration server 704 and/or the access manager 702 may then provide an authentication notification to the client device B, which may indicate that the user should perform a secondary factor authentication credential and/or the access manager 702 (or registration server 704) may provide the secondary authentication challenge.

Per step 7, the user may generate and send a second authentication credential (e.g., take and send a digital picture), while client device B transmits (or the access manager 702 retrieves) the Device B fingerprint (and potentially other attributes as specified in the table 200) to the access manager 702. Per step 8, the access manager 702 may then forward the device B fingerprint and the second credential to the registration server 704 for N-factor authentication validation. Per step 9, the registration server 704 may match the client device B fingerprint of the to the corresponding device fingerprint within a database (e.g., the device fingerprint and attribute 112). The corresponding device fingerprint may have been pre-registered, such as at registration time in FIGS. 2A and 2B. The registration server 704 may additionally validate the second credential (e.g., verify that the digital picture matches another stored digital picture). Per step 10, the registration server 704 and/or the access manager 702 may then provide an authentication notification to the client device B, which may indicate that access has been granted (e.g., for client device B only) to access the protected resource 706. Per block 11, the client device B may then retrieve the data/protected resource 706.

FIG. 8 is a block diagram of a computing device 800 that includes an authentication application, according to embodiments. In some embodiments, the computing device 800 represents the client devices as described herein and/or one or more components of the server system (e.g., registration server, access manager, etc.). The components of the computing device 800 can include one or more processors 06, a memory 12, a terminal interface 18, a storage interface 20, an Input/Output ("I/O") device interface 22, and a network interface 24, all of which are communicatively coupled, directly or indirectly, for inter-component communication via a memory bus 10, an I/O bus 16, bus interface unit ("IF") 08, and an I/O bus interface unit 14.

The computing device 800 may include one or more general-purpose programmable central processing units (CPUs) 06A and 06B, herein generically referred to as the processor 06. In an embodiment, the computing device 800 may contain multiple processors; however, in another embodiment, the computing device 800 may alternatively be a single CPU device. Each processor 06 executes instructions stored in the memory 12 (e.g., the affinity module 518 and the failover module 520 instructions).

The computing device 800 may include a bus interface unit 08 to handle communications among the processor 06, the memory 12, the display system 04, and the I/O bus interface unit 14. The I/O bus interface unit 14 may be coupled with the I/O bus 16 for transferring data to and from the various I/O units. The I/O bus interface unit 14 may communicate with multiple I/O interface units 18, 20, 22, and 24, which are also known as I/O processors (IOPs) or I/O adapters (IOAs), through the I/O bus 16. The display system 04 may include a display controller, a display memory, or both. The display controller may provide video, audio, or both types of data to a display device 02. The display memory may be a dedicated memory for buffering video data. The display system 04 may be coupled with a display device 02, such as a standalone display screen, computer monitor, television, a tablet or handheld device display, or another other displayable device. In an embodiment, the display device 02 may include one or more speakers for rendering audio. Alternatively, one or more speakers for rendering audio may be coupled with an I/O interface unit. In alternate embodiments, one or more functions provided by the display system 04 may be on board an integrated circuit that also includes the processor 06. In addition, one or more of the functions provided by the bus interface unit 08 may be on board an integrated circuit that also includes the processor 06.

The I/O interface units support communication with a variety of storage and I/O devices. For example, the terminal interface unit 18 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 26 and the computing device 800, may receive output data via the user output devices. For example, a user interface may be presented via the user I/O device 26, such as displayed on a display device, played via a speaker, or printed via a printer.

The storage interface 20 supports the attachment of one or more disk drives or direct access storage devices 28 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory 12, or any portion thereof, may be stored to and retrieved from the storage device 28 as needed. The storage devices 28 may be employed to store any of the databases described herein (e.g., the device fingerprints and attributes datastore 112). The I/O device interface 22 provides an interface to any of various other I/O devices or devices of other types, such as printers or fax machines. The network interface 24 provides one or more communication paths from the computing device 800 to other digital devices and computer systems.

Although the computing device 800 shown in FIG. 8 illustrates a particular bus structure providing a direct communication path among the processors 06, the memory 12, the bus interface 08, the display system 04, and the I/O bus interface unit 14, in alternative embodiments the computing device 800 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 08 are shown as single respective units, the computing device 800, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

In various embodiments, the computing device 800 is a multi-user mainframe computer system, a single-user system, or a server computer or similar device that has little or no direct user interface, but receives requests from other computer systems (clients). In other embodiments, the computing device 800 may be implemented as a desktop computer, portable computer, laptop or notebook computer, tablet computer, pocket computer, telephone, smart phone, smart watch, or any other suitable type of electronic device.

In an embodiment, the memory 12 may include a random-access semiconductor memory, storage device, or storage medium (either volatile or non-volatile) for storing or encoding data and programs. In another embodiment, the memory 12 represents the entire virtual memory of the computing device 800, and may also include the virtual memory of other computer systems coupled to the computing device 800 or connected via a network 30. The memory 12 may be a single monolithic entity, but in other embodiments the memory 12 may include a hierarchy of caches and other memory devices. For example, memory may exist in multiple levels of caches, and these caches may be further divided by function, so that one cache holds instructions while another holds non-instruction data, which is used by the processor. Memory 12 may be further distributed and associated with different CPUs or sets of CPUs, as is known in any various so-called non-uniform memory access (NUMA) computer architectures.

The memory 12 may store all or a portion of the components and data (e.g., the authentication application 820) shown in FIG. 8. These programs and data are illustrated in FIG. 8 as being included within the memory 12 in the computing device 800; however, in other embodiments, some or all of them may be on different computer systems and may be accessed remotely, e.g., via a network 30. The computing device 800 may use virtual addressing mechanisms that allow the programs of the computing device 800 to behave as if they only have access to a large, single storage entity instead of access to multiple, smaller storage entities. Thus, while the components and data shown in FIG. 8 are illustrated as being included within the memory 12, these components and data are not necessarily all completely contained in the same storage device at the same time. Although the components and data shown in FIG. 8 are illustrated as being separate entities, in other embodiments some of them, portions of some of them, or all of them may be packaged together.

In an embodiment, the components and data shown in FIG. 8 (e.g., the authentication application 820) may include instructions or statements that execute on the processor 06 or instructions or statements that are interpreted by instructions or statements that execute on the processor 06 to carry out the functions as described above. In another embodiment, the components shown in FIG. 8 may be implemented in hardware via semiconductor devices, chips, logical gates, circuits, circuit cards, and/or other physical hardware devices in lieu of, or in addition to, a processor-based system. In an embodiment, the components shown in FIG. 5 may include data in addition to instructions or statements.

In some embodiments, the authentication application 820 represents the authentication applications 120, 122, 220, 203, of FIGS. 1 and 2 as located on a client device. The authentication application 820 may thus provide some or all of the processes described in any figure herein, including the process 300 of FIG. 3, the process 600 of FIG. 6, the operations of the sequence diagram of FIG. 7, or other operations relating to FIG. 1, 2A, 2B, 4, 5, or 6. In some embodiments, the authentication application 820 represents functions that a server system (e.g., the access manager 118 and/or the registration server 110) performs. For example, the authentication application 820 may include program instructions that are executed by a processor to perform some or all of the operations as specified in FIG. 6, or any other operation associated with FIGS. 1, 2, 3, 4, 5, and/or 7.

FIG. 8 is intended to depict representative components of the computing device 800. Individual components, however, may have greater complexity than represented in FIG. 8. In FIG. 8, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different ways, including using various computer applications, routines, components, programs, objects, modules, data pages etc., which may be referred to herein as "software," "computer programs," or simply "programs."

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, in response to a user initiating a download of a first application on a first client device, a first device fingerprint of the first client device;
    notifying, in response to the receiving of the first device fingerprint, the first client device indicating that the user needs to download a second application on another client device;
    receiving, in response to the user initiating a download of the second application on a second client device, a second device fingerprint of the second client device;
    receiving, subsequent to receiving the first device fingerprint, by a server system and from the first client device, a first user request to access a particular resource;
    receiving, subsequent to receiving the first user request, a third device fingerprint of the first client device, wherein a generating of the third device fingerprint includes obtaining an identifier for each of a plurality of hardware components of the first client device and combining at least some of the identifiers from different hardware components to form the third device fingerprint;
    determining whether the first device fingerprint matches the third device fingerprint;
    receiving, by the server system, a first authentication credential from the first client device based on a first authentication challenge being issued to the user of the first client device;
    notifying, by the server system, the second client device of the user to prompt the user to provide a second authentication credential to complete at least a second authentication challenge, the access to the particular resource requiring at least successfully completing the first authentication challenge on the first client device and successfully completing the second authentication challenge on the second client device;
    receiving, subsequent to the notifying of the second client device, a fourth device fingerprint of the second client device; and
    determining whether the second device fingerprint matches the fourth device fingerprint.

2. The method of claim 1, further comprising:
    determining that the first authentication credential was completed successfully and that the first device fingerprint matches the third device fingerprint;
    determining that the second authentication credential was completed successfully and that the second device fingerprint matches the fourth device fingerprint; and
    in response to the determining that the first authentication credential was completed successfully and that the first device fingerprint matches the third device fingerprint and that the second authentication credential was completed successfully and that the second device fingerprint matches the fourth device fingerprint, granting access to the particular resource.

3. The method of claim 1, wherein the notifying the second client device is based on the first client device being able to establish a wireless connection over a personal area network with the second client device.

4. The method of claim 1, wherein the notifying of the second client device occurs in response to the user moving the second client device above a movement threshold after notifying the first client device to complete the first authentication challenge.

5. The method of claim 1, further comprising, receiving a plurality of attributes from the first client device including each attribute from a group consisting of: a device ID of the first client device, a device fingerprint of the first client device, a notification capability of the first client device, information indicating whether the first client device includes a human fingerprint reader, and information indicating whether the first client device includes an accelerometer.

6. A system comprising:
    a computing device having a processor; and
    a computer readable storage medium having program instructions embodied therewith, the program instructions executable by the processor to cause the system to perform a method, the method comprising:
    receiving, in response to a user initiating a download of a first application on a first client device, a first device fingerprint of the first client device;
    notifying, in response to the receiving of the first device fingerprint, the first client device indicating that the user needs to download a second application on another client device;
    receiving, in response to the user initiating a download of the second application on a second client device, a second device fingerprint of the second client device;
    receiving, subsequent to receiving the first device fingerprint, a first user request to access a particular resource;
    receiving, subsequent to receiving the first user request, a third device fingerprint of the first client device, wherein a generating of the third device fingerprint includes obtaining an identifier for each of a plurality of hardware components of the first client device and combining at least some of the identifiers from different hardware components to form the third device fingerprint;
    determining whether the first device fingerprint matches the third device fingerprint;
    receiving a first authentication credential from the first client device based on a first authentication challenge being issued to the user of the first client device;
    notifying the second client device of the user to prompt the user to provide a second authentication credential to complete at least a second authentication challenge, the access to the particular resource requiring at least successfully completing the first authentication challenge on the first client device and the second authentication challenge on the second client device, wherein the first client device and the second client device must be different devices in order to access the particular resource;

receiving, subsequent to the notifying of the second client device, a fourth device fingerprint of the second client device; and determining whether the second device fingerprint matches the fourth device fingerprint.

7. The system of claim 6, the method further comprising:

determining that the first authentication credential was completed successfully and that the first device fingerprint matches the third device fingerprint;

determining that the second authentication credential was completed successfully and that the second device fingerprint matches the fourth device fingerprint; and in response to the determining that the first authentication credential was completed successfully and that the first device fingerprint matches the third device fingerprint and that the second authentication credential was completed successfully and that the second device fingerprint matches the fourth device fingerprint, granting access to the particular resource.

8. The system of claim 6, wherein the notifying the second client device occurs in response to the first client device establishing a wireless connection over a personal area network (PAN) with the second client device.

9. The system of claim 6, wherein the notifying of the second client device occurs in response to the second client device moving above a movement threshold after notifying the first client device to complete the first authentication challenge, wherein a determining that the second client device moves above the movement threshold includes identifying an accelerometer reading of the second client device after the notifying the first client device to complete the first authentication challenge.

10. A computer program product comprising a computer readable storage medium having program code embodied therewith, the program code executable by a computing device to:

receive, in response to a user initiating a download of a first application on a first client device, a first device fingerprint of the first client device;

notify, in response to receiving the first device fingerprint, the first client device indicating that the user needs to download a second application on another client device;

receive, in response to the user initiating a download of the second application on a second client device, a second device fingerprint of the second client device;

receive, subsequent to receiving the first device fingerprint, a first user request to access a particular resource;

receive, subsequent to receiving the first user request, a third device fingerprint of the first client device, wherein a generating of the third device fingerprint includes obtaining an identifier for each of a plurality of hardware components of the first client device and combining at least some of the identifiers from different hardware components to form the third device fingerprint;

determine whether the first device fingerprint matches the third device fingerprint;

receive a first authentication credential from the first client device based on a first authentication challenge being issued to the user of the first client device;

notify the second client device of the user to prompt the user to provide a second authentication credential to complete at least a second authentication challenge, the access to the particular resource requiring at least successfully completing the first authentication challenge on the first client device and successfully completing the second authentication challenge on the second client device;

receive, subsequent to notifying the second client device, a fourth device fingerprint of the second client device; and determine whether the second device fingerprint matches the fourth device fingerprint.

11. The computer program product of claim 10, wherein the notifying the second client device is based on the first client device being able to establish a wireless connection over a personal area network with the second client device.

12. The computer program product of claim 10, wherein the notifying of the second client device occurs in response to the user moving the second client device above a movement threshold after notifying the first client device to complete the first authentication challenge.

* * * * *